(12) United States Patent
Kim et al.

(10) Patent No.: US 12,710,791 B2
(45) Date of Patent: Aug. 18, 2026

(54) DISPLAY APPARATUS AND METHOD OF MANUFACTURING THE DISPLAY APPARATUS

(71) Applicant: SAMSUNG DISPLAY CO., LTD., Yongin-si (KR)

(72) Inventors: Junhyeong Kim, Yongin-si (KR); Youngmin Cho, Yongin-si (KR); Woosuk Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 406 days.

(21) Appl. No.: 18/152,411

(22) Filed: Jan. 10, 2023

(65) Prior Publication Data

US 2023/0259171 A1 Aug. 17, 2023

(30) Foreign Application Priority Data

Feb. 17, 2022 (KR) ........................ 10-2022-0021041

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
None
See application file for complete search history.

(56) References Cited

U.S. PATENT DOCUMENTS 7,456,909 B2 * 11/2008 Park .................. G02F 1/136204 349/40
10,304,869 B2 * 5/2019 Kwon .................... H10K 50/84
10,490,755 B2 * 11/2019 Jang ....................... H10K 77/10
10,602,645 B2 * 3/2020 Qi .......................... H05K 1/028
11,483,940 B2 10/2022 Ro
11,703,917 B2 * 7/2023 Ishikawa ............... G06F 1/1616 361/807
11,895,904 B2 * 2/2024 You ......................... B32B 7/022
11,927,987 B2 3/2024 Lee et al.
11,957,031 B2 * 4/2024 Zhou .................... H10K 59/871
12,025,870 B2 * 7/2024 Wang ................ G02F 1/133305
12,189,160 B2 * 1/2025 Luo .................... H10K 59/8791
2014/0301044 A1 * 10/2014 Oh ........................ G06F 1/1652 361/749
2016/0174304 A1 * 6/2016 Kim .................. H10K 59/8792

(Continued)

FOREIGN PATENT DOCUMENTS

KR 101108782 B1 1/2012
KR 1020190134294 A 12/2019

(Continued)

*Primary Examiner* — Imani N Hayman
*Assistant Examiner* — Rashen E Morrison
(74) *Attorney, Agent, or Firm* — CANTOR COLBURN LLP

(57) ABSTRACT

A display apparatus includes a display panel including a display area and a peripheral area surrounding the display area, where the peripheral area includes a bending area extending from one side thereof, a cover window arranged on the display area of the display panel, an adhesive layer between the display panel and the cover window, and a protective layer covering the bending area and in contact with the adhesive layer, where a modulus of the adhesive layer is less than a modulus of the protective layer.

21 Claims, 14 Drawing Sheets

(56) References Cited

U.S. PATENT DOCUMENTS

| | | | | |
|---|---|---|---|---|
| 2018/0076412 | A1* | 3/2018 | Kim | G06F 1/1637 |
| 2018/0337224 | A1* | 11/2018 | Aoki | H10K 71/00 |
| 2020/0328375 | A1* | 10/2020 | Won | H10K 77/111 |
| 2020/0363882 | A1* | 11/2020 | Nam | H05K 1/147 |
| 2021/0202868 | A1 | 7/2021 | Paek et al. | |
| 2024/0157669 | A1* | 5/2024 | Zhang | B32B 3/04 |

FOREIGN PATENT DOCUMENTS

| | | | |
|---|---|---|---|
| KR | 1020190135173 | A | 12/2019 |
| KR | 1020210008262 | A | 1/2021 |
| KR | 1020210052071 | A | 5/2021 |
| KR | 1020210086284 | A | 7/2021 |
| KR | 1020210086318 | A | 7/2021 |
| KR | 1020210101428 | A | 8/2021 |
| KR | 1020220009524 | A | 1/2022 |

* cited by examiner

DISPLAY APPARATUS AND METHOD OF MANUFACTURING THE DISPLAY APPARATUS

This application claims priority to Korean Patent Application No. 10-2022-0021041, filed on Feb. 17, 2022, and all the benefits accruing therefrom under 35 U.S.C. § 119, the content of which in its entirety is herein incorporated by reference.

BACKGROUND

1. Field

One or more embodiments relate to a display apparatus and a method of manufacturing the display apparatus, and more particularly, to a display apparatus capable of preventing defects due to an electrostatic discharge in a bent area of a display panel, and a method of manufacturing the display apparatus.

2. Description of the Related Art

Recently, electronic apparatuses have been widely used in various fields. Electronic apparatuses may be mobile electronic apparatuses or fixed-type electronic apparatuses. To support various functions, the electronic apparatuses may include a display apparatus that may provide a user with visual information such as images.

Recently, as the sizes of parts for driving a display apparatus decrease, a portion of the display apparatus in an electronic apparatus has gradually increased, and a structure to enable the display apparatus to be bent from a flat state by a certain angle or to be folded with respect to an axis has been developed.

In general, a display apparatus includes a display panel, and the display panel includes a display area and a peripheral area that is a non-display area adjacent to the display area. In such a display panel, by bending at least a portion of the peripheral area, visibility at various angles may be improved or the size of the non-display area may be reduced.

SUMMARY

In general, an electrostatic discharge (ESD) occurs in a bent area of a display panel, and accordingly, wires of the display panel may be damaged.

One or more embodiments provide a display apparatus, capable of improving defects in a display panel by preventing an ESD from occurring in the display panel, and a method of manufacturing the display apparatus.

According to one or more embodiments, a display apparatus includes a display panel including a display area and a peripheral area surrounding the display area, where the peripheral area includes a bending area extending from one side thereof, a cover window arranged on the display area of the display panel, an adhesive layer between the display panel and the cover window, and a protective layer covering the bending area and in contact with the adhesive layer, where a modulus of the adhesive layer is less than a modulus of the protective layer.

According to an embodiment, the protective layer may include a convex portion in an area adjacent to a contact point where the protective layer and the adhesive layer are in contact with each other.

According to an embodiment, a height of the protective layer at the contact point may be greater than a height of the adhesive layer at the contact point.

According to an embodiment, one end of the cover window may be spaced apart from the contact point in a direction away from the protective layer.

According to an embodiment, the cover window may expose the adhesive layer between the one end of the cover window and the contact point.

According to an embodiment, the protective layer may include a concave portion in an area adjacent to a contact point where the protective layer and the adhesive layer are in contact with each other.

According to an embodiment, a height of the protective layer at the contact point may be less than a height of the adhesive layer at the contact point.

According to an embodiment, the cover window may cover the contact point, and one end of the cover window may overlap the concave portion on a plane.

According to an embodiment, one surface of the cover window may be spaced apart from a concave surface of the concave portion in a height direction.

According to an embodiment, the protective layer and the adhesive layer may be in contact with each other and may not overlap each other on a plane.

According to an embodiment, the display apparatus may be folded with respect to a folding axis extending in one direction.

According to one or more embodiments, a method of manufacturing a display apparatus includes preparing a display panel including a display area and a peripheral area surrounding the display area, where the peripheral area includes a bending area extending from one side thereof, providing an adhesive layer on the display panel, providing a protective layer to cover the bending area and to be in contact with the adhesive layer, where the protective layer has a modulus greater than a modulus of the adhesive layer, and providing a cover window on the adhesive layer.

According to an embodiment, the providing the protective layer may include applying the protective layer not to overlap the adhesive layer on a plane, by using the adhesive layer as a dam.

According to an embodiment, the providing the protective layer may further include providing a convex portion in the protective layer in an area adjacent to a contact point where the protective layer and the adhesive layer are in contact with each other.

According to an embodiment, the providing the cover window may include providing the cover window in a away such that one end of the cover window is spaced apart from the contact point in a direction away from the protective layer.

According to an embodiment, the method may further include removing the convex portion and forming a concave portion in the protective layer, in the area adjacent to the contact point where the protective layer and the adhesive layer are in contact with each other.

According to an embodiment, the providing the cover window may include providing the cover window in a away such that the cover window covers the contact point and one end of the cover window overlaps the concave portion on a plane.

According to an embodiment, one surface of the cover window may be spaced apart from a concave surface of the concave portion, not to be in contact with the concave surface of the concave portion.

According to an embodiment, the providing the adhesive layer may include providing the adhesive layer with a release film attached to an upper portion of the adhesive layer, and the providing the protective layer may include applying the protective layer not to overlap the adhesive layer and the release film on a plane, by using the adhesive layer and the release film as a dam, where, after the providing the protective layer, the release film may be removed before the cover window is providing.

According to an embodiment, a height of the protective layer a contact point where the protective layer and the adhesive layer are in contact with each other may be greater than a height of the adhesive layer at the contact point.

Other features of the disclosure will become more apparent from the detailed description, the claims, and the drawings.

BRIEF DESCRIPTION OF THE DRAWINGS

The above and other features of certain embodiments will be more apparent from the following description taken in conjunction with the accompanying drawings, in which.

DETAILED DESCRIPTION

Figure 1:
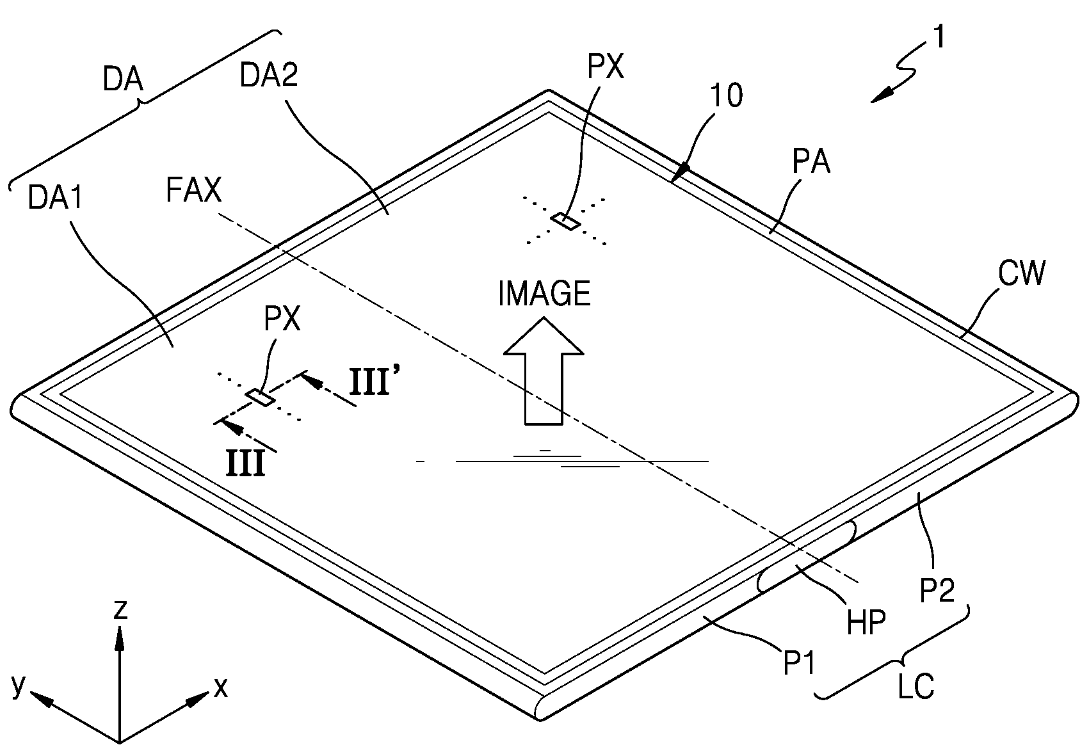
FIGS. 1 and 2 are schematic perspective views of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

As the disclosure allow for various changes and numerous embodiments, certain embodiments will be illustrated in the drawings and described in the written description. Features of the disclosure, and implementation methods thereof will be clarified through following embodiments described with reference to the accompanying drawings. The disclosure may, however, be embodied in many different forms and should not be construed as limited to the embodiments set forth herein.

Hereinafter, embodiments will be described in detail by referring to the accompanying drawings. In descriptions with reference to the drawings, the same reference numerals are given to elements that are the same or substantially the same and descriptions will not be repeated.

It will be understood that although the terms "first," "second," etc. may be used herein to describe various elements, these elements should not be limited by these terms. These elements are only used to distinguish one element from another.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b, or c" or "at least one selected from a, b, and c" indicates only a, only b, only c, both a and b, both a and c, both b and c, all of a, b, and c, or variations thereof.

It will be further understood that the terms "comprises" and/or "comprising" or "includes" and/or "including" used herein specify the presence of stated features or elements, but do not preclude the presence or addition of one or more other features or elements.

It will be further understood that, when a layer, region, or element is referred to as being "on" another layer, region, or element, it can be directly or indirectly on the other layer, region, or element. That is, for example, intervening layers, regions, or elements may be present.

Sizes of elements in the drawings may be exaggerated or reduced for convenience of explanation. In other words, since sizes and thicknesses of elements in the drawings are arbitrarily illustrated for convenience of description, the following embodiments are not limited thereto.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another. Herein, directions of the x-axis, the y-axis, and the z-axis may be referred to as +x direction, +y direction and +z direction, respectively, and directions opposite thereto may be referred to as −x direction, −y direction and −z direction, respectively.

In the case where a certain embodiment may be implemented differently, a specific process order may be performed in the order different from the described order. As an example, two processes that are successively described may be performed substantially simultaneously or performed in the order opposite to the order described.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
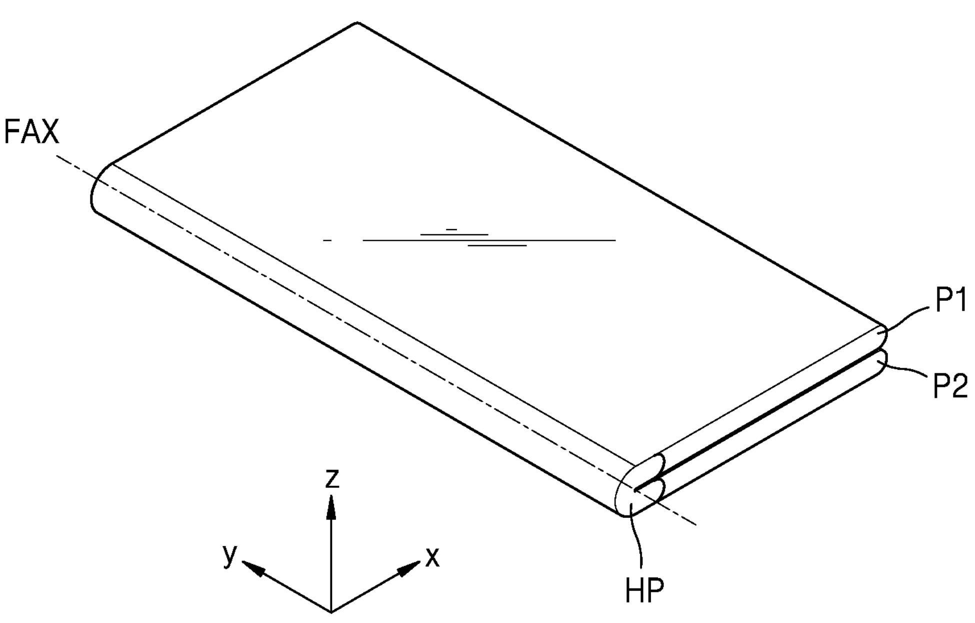

FIGS. 1 and 2 are schematic perspective views of a display apparatus 1 according to an embodiment. In detail, FIG. 1 shows the display apparatus 1 in a state in which the display apparatus 1 is unfolded (or in an unfolded state), and FIG. 2 shows the display apparatus 1 in a state in which the display apparatus 1 is folded (or in a folded state).

Referring to FIGS. 1 and 2, an embodiment of the display apparatus 1 is an apparatus configured to display a moving image or a still image, and may be used as a display screen of not only portable electronic apparatuses, such as mobile phones, a smartphones, tablet personal computers (PCs), mobile communication terminals, electronic notebooks, electronic books, portable multimedia players (PMPs), navigation devices, and ultra-mobile PCs (UMPCs), but also various products, such as televisions, laptop computers, monitors, billboards, and Internet of things (IoT). Furthermore, the display apparatus 1 according to an embodiment may be used for wearable devices such as smart watches, watch phones, glasses type displays, and head mounted displays (HMDs). Furthermore, the display apparatus 1 according to an embodiment may be used as a display for an instrument panel for vehicles, a center information display (CID) arranged on the center fascia or dashboard of vehicles, a room mirror display in lieu of a side mirror of vehicles, or a display arranged at the rear side of a front seat as an entertainment for a rear seat of vehicles.

The display apparatus 1 may have a substantially rectangular shape, as shown in FIG. 1. In an embodiment, for example, the display apparatus 1, as shown in FIG. 1, has an overall rectangular flat shape having a short side extending in a first direction, e.g., an +x direction (hereinafter, x-direction) or a −x direction, and a long side extending in a second direction, e.g., a +y direction (hereinafter, y-direction) or a −y direction. In an embodiment, a portion where the short side extending in the first direction, e.g., the x-direction or the −x direction, and the long side extending in the second direction, e.g., the y-direction or the −y direction, meet may have a right angle shape or a round shape having a certain curvature. The flat shape of the display apparatus 1 is not limited to a rectangular shape, and the display apparatus 1 may have other shapes such as polygonal, circular, or elliptical shapes.

The display apparatus 1 may include a lower cover LC, a display panel 10, and a cover window CW.

The lower cover LC may form a lower external appearance of the display apparatus 1. The lower cover LC may include plastic, metal, or both plastic and metal. The lower cover LC may include a first portion P1 and a second portion P2, which support the display panel 10. The lower cover LC may be folded or foldable with respect to a folding axis FAX defined between the first portion P1 and the second portion P2. In an embodiment, the lower cover LC may further include a hinge portion HP, and the hinge portion HP may be between the first portion P1 and the second portion P2.

The display panel 10 may include the display area DA and the peripheral area PA. The display area DA may display an image. In an embodiment, pixels PX may be disposed or arranged in the display area DA. The display panel 10 may provide an image by using light emitted from the pixels PX. Each of the pixels PX may emit light by using a display element. In an embodiment, each of the pixels PX may emit red, green, or blue light. In an alternative embodiment, each of the pixels PX may emit red, green, blue, or white light.

The peripheral area PA may be a non-display area that is an area that does not provide an image. The peripheral area PA may at least partially surround the display area DA. In an embodiment, for example, the peripheral area PA may entirely surround the display area DA. A driver for providing an electrical signal to the pixels PX, a power wire for providing power, and the like may be arranged in the peripheral area PA. In an embodiment, for example, a scan driver for applying a scan signal to the pixels PX may be arranged in the peripheral area PA. In such an embodiment, a data driver for applying a data signal to the pixels PX may be arranged in the peripheral area PA.

The display area DA may include a first display area DA1 and a second display area DA2, which are arranged on two opposite sides of the folding axis FAX crossing the display area DA. The first display area DA1 and the second display area DA2 may be respectively disposed on the first portion P1 and the second portion P2 of the lower cover LC. The display panel 10 may provide a first image and a second image by using light emitted from a plurality of pixels PX arranged in the first display area DA1 and the second display area DA2. In an embodiment, the first image and the second image may be portions of any one image provided through the display area DA of the display panel 10. Alternatively, in an embodiment, the display panel 10 may provide a first image and a second image, which are independent from each other.

The display panel 10 may be folded with respect to the folding axis FAX. In an embodiment, when the display panel 10 is folded, the first display area DA1 and the second display area DA2 of the display panel 10 may face each other. In an alternative embodiment, when the display panel 10 is folded, the first display area DA1 and the second display area DA2 of the display panel 10 may face opposite directions.

That is, in an embodiment, the display panel 10 may be in-folded or out-folded with respect to the folding axis FAX. Here, in-folding may refer to the display panel 10 being folded in a +z direction with respect to the folding axis FAX, and out-folding may refer to the display panel 10 being folded in a −z direction with respect to the folding axis FAX. In other words, in-folding may refer to portions of the upper surface of the cover window CW being folded to face each other, and out-folding may refer to portions of the lower surface of the cover window CW being folded to face each other, the cover window CW being disposed on the display panel 10. In this case, the lower surface of the cover window CW may refer to a surface closer to a substrate 100 (see FIG. 4) in a z-direction than the upper surface of the cover window CW.

In an embodiment, as shown in FIGS. 1 and 2, the folding axis FAX may extend in the y-direction, but one or more embodiments are not limited thereto. In an alternative embodiment, the folding axis FAX may extend in the x-direction crossing the y-direction. Alternatively, on a x-y plane, the folding axis FAX may extend in a direction crossing the x-direction and y-direction.

In an embodiment, as shown in FIGS. 1 and 2, a single folding axis FAX is provided, but one or more embodiments are not limited thereto. In an alternative embodiment, the display panel 10 may be folded with respect to two folding axes FAX crossing the display area DA. In an embodiment, for example, when the display panel 10 is folded with respect to the two folding axes FAX, the display panel 10 may be in-folded with respect to one folding axis FAX or may be out-folded with respect to the other folding axis FAX. Alternatively, the display panel 10 may be in-folded or out-folded with respect to the two folding axes FAX. In an embodiment, the display panel 10 may be folded with respect to a plurality of folding axes FAX crossing the display area DA. In such an embodiment, the display panel 10 may be in-folded or out-folded with respect to each of the folding axes FAX.

The cover window CW may be disposed on the display panel 10 and may cover the display panel 10. The cover window CW may be folded or bent according to an external force without cracking or the like. When the display panel 10 is folded with respect to the folding axis FAX, the cover window CW may be folded together with the display panel 10 while covering the display panel 10.

Figure 3A:
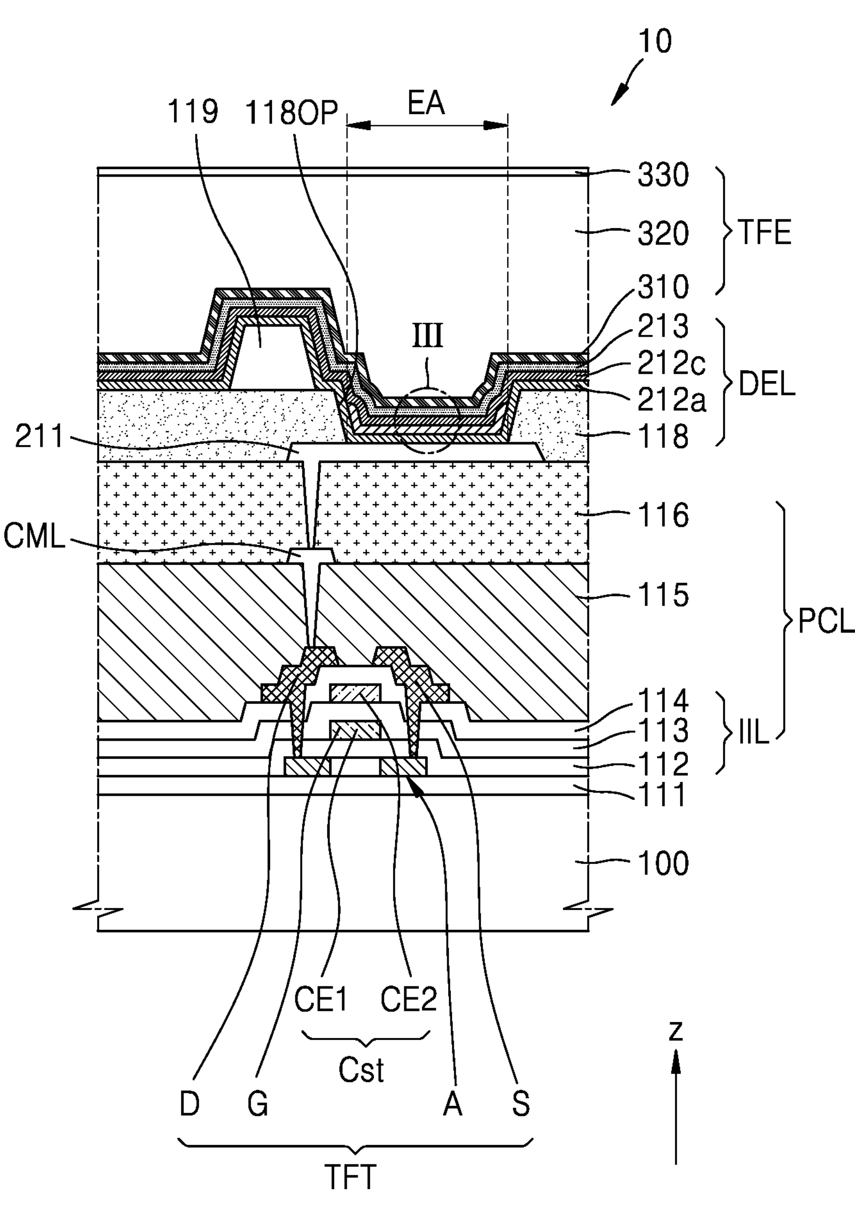
FIG. 3A is a schematic cross-sectional view of a display panel, taken along line III-III' of FIG. 1, according to an embodiment.
Figure 3B:
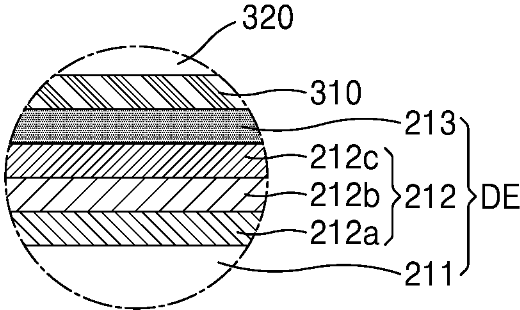
FIG. 3B is an enlarged view of the encircled portion of FIG. 3A.

FIG. 3A is a schematic cross-sectional view of the display panel 10, taken along line III-III' of FIG. 1, according to an embodiment, and FIG. 3B is an enlarged view of the encircled portion of FIG. 3A.

Referring to FIG. 3A, the display panel 10 may include the substrate 100, a buffer layer 111, a pixel circuit layer PCL, a display element layer DEL, and a thin-film encapsulation layer TFE.

The substrate 100 may include glass or a polymer resin such as polyethersulfone, polyarylate, polyetherimide, polyethylene naphthalate, polyethylene terephthalate, polyphenylene sulfide, polyimide, polycarbonate, cellulose triacetate, or cellulose acetate propionate. In an embodiment, the substrate 100 may have a multi-layered structure including a base layer and a barrier layer (not shown), the base layer including the polymer resin. The substrate 100 including the polymer resin may be flexible, rollable, and bendable.

The buffer layer 111 may be disposed on the substrate 100. The buffer layer 111 may include an inorganic insulating material such as silicon nitride, silicon oxynitride, and silicon oxide and be defined by a single layer or a multi-layer including the inorganic insulating material.

The pixel circuit layer PCL may be disposed on the buffer layer 111. The pixel circuit layer PCL may include a thin-film transistor TFT included in a pixel circuit, and an inorganic insulating layer IIL, a first planarization layer 115, and a second planarization layer 116 arranged below and/or over elements of the thin-film transistor TFT. The inorganic insulating layer IIL may include a first gate insulating layer 112, a second gate insulating layer 113, and an interlayer insulating layer 114.

The thin-film transistor TFT may include a semiconductor layer A. The semiconductor layer A may include polycrystalline silicon. Alternatively, the semiconductor layer A may include amorphous silicon, an oxide semiconductor, an organic semiconductor, and the like. The semiconductor layer A may include a channel region, a drain region, and a source region, and the drain region and the source region may be respectively on two opposite sides of the channel region. A gate electrode G may overlap the channel region.

The gate electrode G may include a low-resistance metal material. The gate electrode G may include a conductive material including molybdenum (Mo), aluminum (Al), copper (Cu), or titanium (Ti) and may be defined by a single layer or a multi-layer including at least one selected from the aforementioned materials.

The first gate insulating layer 112 between the semiconductor layer A and the gate electrode G may include an inorganic insulating material such as silicon nitride ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Here, ZnO may be ZnO and/or $ZnO_2$.

The second gate insulating layer 113 may cover the gate electrode G. In an embodiment, the second gate insulating layer 113 may include an inorganic insulating material such as $SiO_2$, $SiN_x$, SiON, $Al_2O_3$, $TiO_2$, $Ta_2O_5$, $HfO_2$, or $ZnO_x$. Here, ZnO may be ZnO and/or $ZnO_2$.

An upper electrode CE2 of the storage capacitor Cst may be disposed on the second gate insulating layer 113. The upper electrode CE2 may overlap the gate electrode G therebelow. In an embodiment, the gate electrode G and the upper electrode CE2 overlapping each other with the second gate insulating layer 113 therebetween may constitute or collectively define the storage capacitor Cst of the pixel circuit. That is, the gate electrode G may serve as a lower electrode CE1 of the storage capacitor Cst. As described above, the storage capacitor Cst and the thin-film transistor TFT may overlap each other. In some embodiments, the storage capacitor Cst may not overlap the thin-film transistor TFT.

The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu and may be defined by a single layer or a multi-layer including at least one selected from the aforementioned materials.

The interlayer insulating layer 114 may cover the upper electrode CE2. The interlayer insulating layer 114 may include $SiO_2$, $SiN_x$, SiON, $Al_2O_3$, $TiO_2$, $Ta_2O_5$, $HfO_2$, or $ZnO_x$. Here, ZnO may be ZnO and/or $ZnO_2$. The interlayer insulating layer 114 may be defined by a single layer or a multi-layer including at least one selected from the aforementioned inorganic insulating materials.

A drain electrode D and a source electrode S may each be arranged over the interlayer insulating layer 114. The drain electrode D and the source electrode S may each include a material having high conductivity. The drain electrode D and the source electrode S may each include a conductive material including Mo, Al, Cu, and Ti and may each be defined by a single layer or a multi-layer including at least one selected from the aforementioned materials. In an embodiment, the drain electrode D and the source electrode S may each have a multi-layered structure of Ti/Al/Ti.

The first planarization layer 115 may cover the drain electrode D and the source electrode S. The first planarization layer 115 may include an organic insulating material. The first planarization layer 115 may include an organic insulating material including a general-purpose polymer such as polymethylmethacrylate (PMMA) or polystyrene (PS), polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof.

A connection electrode CML may be arranged over the first planarization layer 115. In an embodiment, the connection electrode CML may be connected to the drain electrode D or the source electrode S through a contact hole defined in the first planarization layer 115. The connection electrode CML may include a material having high conductivity. The connection electrode CML may include a conductive material including Mo, Al, Cu, and Ti and may be defined by a single layer or a multi-layer including at least one selected from the aforementioned materials. In an embodiment, the connection electrode CML may have a multi-layered structure of Ti/Al/Ti.

The second planarization layer 116 may cover the connection electrode CML. The second planarization layer 116 may include an organic insulating layer. The second planarization layer 116 may include an organic insulating material including a general-purpose polymer such as PMMA or PS, polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof.

The display element layer DEL may be arranged over the pixel circuit layer PCL. The display element layer DEL may include a display element DE. The display element DE may be an organic light-emitting diode (OLED). A pixel electrode 211 of the display element DE may be electrically connected to the connection electrode CML through a contact hole defined in the second planarization layer 116.

In an embodiment, the pixel electrode 211 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). In an alternative embodiment, the pixel electrode 211 may include a reflective layer including Ag, Mg, Al, Pt, Pd, Au, Ni, Nd, Ir, Cr, or a compound thereof. In another alternative embodiment, the pixel electrode 211 may further include a layer over/below the reflective layer, the layer including ITO, IZO, ZnO, or $In_2O_3$.

A pixel-defining layer 118 may be arranged over the pixel electrode 211, and an opening 118OP that exposes a central portion of the pixel electrode 211 may be defined through the pixel-defining layer 118. The pixel-defining layer 118 may include an organic insulating material and/or an inorganic insulating material. The opening 118OP may define an emission area of light emitted from the display element DE (hereinafter, referred to as an emission area EA). In an embodiment, for example, a width of the opening 118OP may correspond to a width of the emission area EA of the display element DE.

In an embodiment, the pixel-defining layer 118 may include a light-blocking material and may be provided in black. The light-blocking material may include carbon block, carbon nanotubes, a resin or paste including black dye, metal particles, such as nickel, aluminum, molybdenum, and alloys thereof, metal oxide particles (e.g., chromium oxide), or metal nitride particles (e.g., chromium nitride). In an embodiment where the pixel-defining layer 118 includes the light-blocking material, reflection of external light by metal structures arranged below the pixel-defining layer 118 may be reduced.

A spacer 119 may be disposed on the pixel-defining layer 118. The spacer 119 may prevent the substrate 100 from being damaged in a method of manufacturing a display apparatus. A mask sheet may be used during manufacturing of a display panel. In an embodiment, as the mask sheet enters the opening 118OP of the pixel-defining layer 118 or is in close contact with the pixel-defining layer 118, during deposition of a deposition material on the substrate 100, the mask sheet may prevent a portion of the substrate 100 from being damaged or broken.

The spacer 119 may include an organic insulating material such as polyimide. Alternatively, the spacer 119 may include an inorganic insulating material including silicon nitride or silicon oxide, or may include an organic insulating material and an inorganic insulating material.

In an embodiment, the spacer 119 may include a material different from that of the pixel-defining layer 118. Alternatively, the spacer 119 and the pixel-defining layer 118 may include a same material as each other. In such an embodiment, the pixel-defining layer 118 and the spacer 119 may be simultaneously formed during a mask process that uses a half-tone mask or the like.

In an embodiment, as shown in FIG. 3B, an intermediate layer 212 may be arranged over the pixel-defining layer 118. In such an embodiment, the intermediate layer 212 may include an emission layer 212*b* arranged in the opening 118OP of the pixel-defining layer 118 on the pixel electrode 211. The emission layer 212*b* may include a polymer organic material or a low-molecular weight organic material emitting light of a certain color.

a first functional layer 212*a* and a second functional layer 212*c* may be respectively arranged below and on the emission layer 212*b*. The first functional layer 212*a* may include, e.g., a hole transport layer (HTL), or include an HTL and a hole injection layer (HIL). The second functional layer 212*c* is an element disposed on the emission layer 212*b* and may be provided optionally. The second functional layer 212*c* may include an electron transport layer (ETL) and/or an electron injection layer (EIL). Similar to an opposite electrode 213 to be described below, the first functional layer 212*a* and/or the second functional layer 212*c* may be common layers entirely covering the substrate 100.

The opposite electrode 213 may include a conductive material having a small work function. In an embodiment, for example, the opposite electrode 213 may include a (semi-)transparent layer including Ag, Mg, Al, Pt, Pd, Au, Ni, Nd, Ir, Cr, lithium (Li), Ca, or an alloy thereof. Alternatively, the opposite electrode 213 may further include a layer on the (semi-)transparent layer including at least one selected from the aforementioned materials, and the layer may include ITO, IZO, ZnO, or $In_2O_3$.

In some embodiments, a capping layer (not shown) may be further arranged over the opposite electrode 213. The capping layer may include lithium fluoride (LiF), an inorganic material, and/or an organic material.

The thin-film encapsulation layer TFE may be arranged over the opposite electrode 213. In an embodiment, the thin-film encapsulation layer TFE may include at least one inorganic encapsulation layer and at least one organic encapsulation layer. FIG. 3A shows an embodiment where the thin-film encapsulation layer TFE includes a first inorganic encapsulation layer 310, an organic encapsulation layer 320, and a second inorganic encapsulation layer 330, which are sequentially stacked one on another.

The first inorganic encapsulation layer 310 and the second inorganic encapsulation layer 330 may include at least one inorganic material selected from aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include an acryl-based resin, an epoxy-based resin, polyimide, or polyethylene. In an embodiment, the organic encapsulation layer 320 may include acrylate.

Although not shown, a touch sensor layer may be arranged over the thin-film encapsulation layer TFE, and the touch sensor layer may obtain coordinate information according to an external input, e.g., a touch event.

Figure 4:
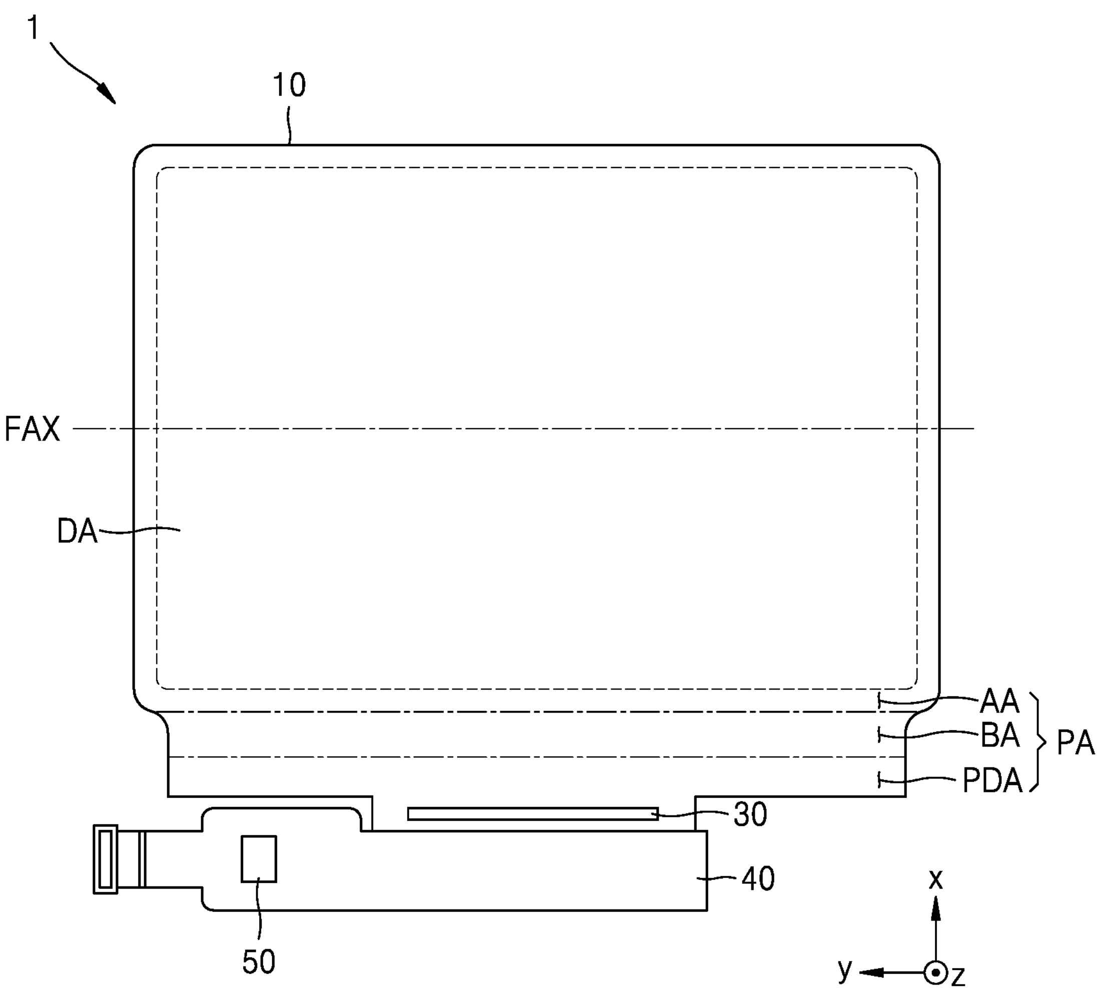
FIG. 4 is a schematic plan view of a portion of a display apparatus according to an embodiment.
Figure 5:
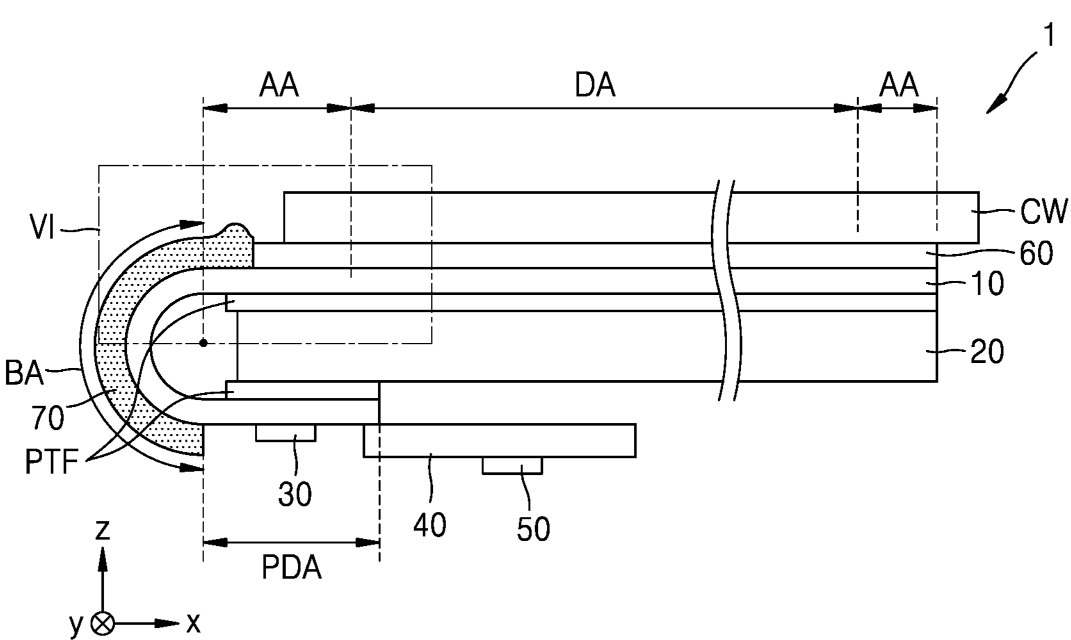
FIG. 5 is a schematic side view of a display apparatus including elements shown in FIG. 4.

FIG. 4 is a schematic plan view of a portion of the display apparatus 1 according to an embodiment. FIG. 5 is a schematic side view of the display apparatus 1 including elements shown in FIG. 4. FIG. 5 shows an embodiment of the display panel 10, which is flexible, is in a bent shape in a bending area BA.

Referring to FIGS. 4 and 5, an embodiment of the display apparatus 1 may include the display panel 10, the cover window CW, a display driver 30, a display circuit board 40, a touch sensor driver 50, a cushion layer 20, a protective film PTF, and a protective layer 70.

The display panel 10 may display information processed by the display apparatus 1. In an embodiment, for example, the display panel 10 may display execution screen information about an application executed in the display apparatus 1 or user interface (UI) or graphic user interface (GUI) information according to the execution screen information.

The display panel 10 may include a display element. In an embodiment, for example, the display panel 10 may include an organic light-emitting display panel using an OLED, a micro light emitting display panel using a micro light emitting diode (LED), a quantum dot light-emitting display panel using a quantum dot LED including a quantum dot light-emitting layer, or an inorganic light-emitting display panel using an inorganic light-emitting element including an inorganic semiconductor. Hereinafter, embodiments where the display panel 10 is an organic light-emitting display panel that uses an OLED as a display element is mainly described in detail.

In an embodiment, as described above, the display panel 10 may include the display area DA and the peripheral area PA. The peripheral area PA may include an adjacent area AA, the bending area BA, and a pad area PDA. In such an embodiment, the adjacent area AA may be adjacent to the display area DA and surround the display area DA, the bending area BA may extend from one side of the adjacent area AA and being bendable, and the pad area PDA may be connected to the bending area BA where drivers for applying a scan signal or a data signal are arranged in the pad area PDA.

In an embodiment, the bending area BA may extend from a side of the adjacent area AA through which the folding axis FAX does not pass, and the adjacent area AA surrounds the display area DA. In an embodiment, for example, as shown in FIG. 4, the bending area BA may extend from the adjacent area AA in a −x direction.

The display panel 10 may be bent in the bending area BA. In an embodiment, at least portions of the lower surface of the display panel 10 may face each other, and the pad area PDA of the display panel 10 may be positioned below (e.g., in a −z direction of FIG. 5) other portions of the display panel 10. Accordingly, a size of the peripheral area PA that is recognized by a user may be reduced.

The cover window CW may be arranged over the display panel 10. The cover window CW may protect the display panel 10. In an embodiment, the cover window CW may be a flexible window. The cover window CW may be easily bent according to an external force without cracking or the like and may protect the display panel 10. The cover window CW may include at least one selected from glass, sapphire, and plastic. The cover window CW may include, e.g., ultra-thin glass (UTG) or colorless polyimide (CPI). In an embodiment, the cover window CW may have a structure in which a flexible polymer layer is arranged on one side of a glass substrate or may include only a polymer layer.

The cover window CW may be attached to the display panel 10 via an adhesive layer 60. In an embodiment, the adhesive layer 60 may be a pressure sensitive adhesive (PSA). In an embodiment, the adhesive layer 60 may be a transparent adhesive member such as an optically clear adhesive (OCA) film. The adhesive layer 60 may be formed on an upper portion of the display panel 10 by various methods. In an embodiment, for example, the adhesive layer 60 may be in the form of a film and attached to the upper portion of the display panel 10 (e.g., an upper portion of a thin-film encapsulation layer), or may be in the form of a material and applied to the upper portion of the display panel 10.

The display driver 30 may be arranged in the pad area PDA. The display driver 30 may receive control signals and power voltages, and generate and output signals and voltages for driving the display panel 10. The display driver 30 may include an integrated circuit (IC).

The display circuit board 40 may be electrically connected to the display panel 10. In an embodiment, for example, the display circuit board 40 may be connected in contact with the pad area PDA of the display panel 10, or may be electrically connected to the pad area PDA via an anisotropic conductive film.

The display circuit board 40 may include a flexible printed circuit board (FPCB) that is flexible or a rigid printed circuit board (PCB) that is rigid not to be easily bent. Alternatively, the display circuit board 40 may include a composite printed circuit board that includes both of the rigid printed circuit board and the flexible printed circuit board.

In an embodiment, the touch sensor driver 50 may be disposed on the display circuit board 40. The touch sensor driver 50 may include an IC. The touch sensor driver 50 may be attached to the display circuit board 40. The touch sensor driver 50 may be electrically connected to sensor electrodes of a touch sensor layer of the display panel 10 via the display circuit board 40.

In an embodiment, a power supplier may be further arranged over the display circuit board 40. The power supplier may supply a driving voltage for driving the pixels of the display panel 10 and the display driver 30.

The protective film PTF may be patterned and attached to the lower surface of the display panel 10. In an embodiment, the protective film PTF may be attached to a portion of the lower surface of the display panel 10 excluding the bending area BA. In such an embodiment where the display panel 10 is bent in the bending area BA, a portion and another portion of the protective film PTF may face each other.

In an embodiment, the cushion layer 20 may be between the portions of the protective film PTF. The cushion layer 20 may prevent the display panel 10 from being damaged by absorbing external impact. The cushion layer 20 may include a polymer resin such as polyurethane, polycarbonate, polypropylene, polyethylene, and the like, or an elastic material such as rubber, sponge obtained by foam molding a urethane-based material or an acrylic material, and the like.

The protective layer 70 may cover a portion of the display panel 10, e.g., the bending area BA. The protective layer 70 may be arranged on a same surface of the display panel 10 as a surface on which the adhesive layer 60 is arranged. The protective layer 70 may prevent the display panel 10 from being damaged when the display panel 10 is bent in the bending area BA. This will be described below in detail.

Figure 6:
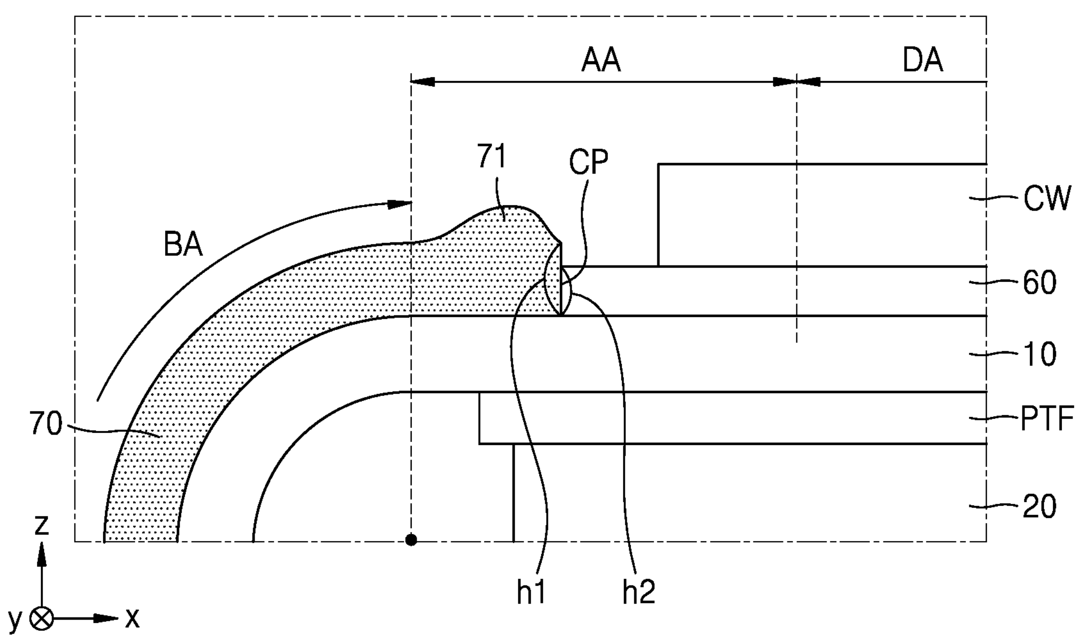
FIG. 6 is a schematic side view of a display apparatus according to an embodiment, showing an enlarged view of an area VI of FIG. 5.

FIG. 6 is a schematic side view of a display apparatus according to an embodiment, showing an enlarged view of an area VI of FIG. 5.

Referring to FIG. 6, in an embodiment, the adhesive layer 60 may be arranged on one surface of the display panel 10. In such an embodiment, the adhesive layer 60 may be between the display panel 10 and the cover window CW arranged over the display panel 10. Accordingly, the adhesive layer 60 may cover the display area DA. Also, the adhesive layer 60 may be cover part or all of the adjacent area AA adjacent to the display area DA as well as the display area DA. In an embodiment, the adhesive layer 60 may be a transparent adhesive member such as an OCA film.

The protective layer 70 may be arranged on one surface of the display panel 10, e.g., on the same surface as the surface on which the adhesive layer 60 is arranged, to cover a portion of the display panel 10, e.g., the bending area BA. Also, one end of the protective layer 70 may extend from the bending area BA to the adjacent area AA adjacent to the bending area BA, and cover the display panel 10, and the other end of the protective layer 70 may extend from the bending area BA to the pad area PDA and cover the display panel 10. In an embodiment, the protective layer 70 may include a photocurable resin. The protective layer 70 may protect the bending area BA from external impact and alleviate stress in the bending area BA. Also, because the protective layer 70 is arranged, a position of a neutral plane may be adjusted so that stress applied to the display panel 10 is significantly reduced.

One end of the protective layer 70 may be in contact with the adhesive layer 60. In an embodiment, as shown in FIG. 6, the protective layer 70 and the adhesive layer 60 may be in contact with each other in the adjacent area AA adjacent to the bending area BA. In such an embodiment, a contact point CP of the protective layer 70 and the adhesive layer 60 may be positioned on the adjacent area AA connected to the bending area BA. The protective layer 70 may be in contact with the adhesive layer 60 and cover the display panel 10, such that the upper surface of the display panel 10 may not be exposed. If the protective layer 70 is spaced apart from the adhesive layer 60 to expose a portion of the display panel 10, an electrostatic discharge (ESD) occurs in a gap between the protective layer 70 and the adhesive layer 60, and accordingly, wires of the display panel 10 may be burned out. In the display apparatus 1 according to an embodiment, the protective layer 70 and the adhesive layer 60 are in contact with each other, and the upper surface of the display panel 10 is not exposed in an area adjacent to the bending area BA, and thus, defects in the display panel 10 due to the ESD may be prevented.

When the display apparatus 1 (see FIG. 4) is folded with respect to the folding axis FAX (see FIG. 4), layers arranged over the display panel 10, e.g., a polarizing film, push the protective layer 70 toward the bending area BA (e.g., a −x direction of FIG. 6), and accordingly, the protective layer 70 may be detached from the display panel 10. This causes wires of the display panel 10 to crack when the protective layer 70 is detached, which causes defects in the display apparatus 1.

According to an embodiment, the adhesive layer 60 may be disposed on the display panel 10, and the cover window CW may be disposed on the adhesive layer 60. In such an embodiment, the polarizing film may not be arranged over the display panel 10. Accordingly, the protective layer 70 arranged over the display panel 10 may be in contact with the adhesive layer 60 disposed on the display panel 10.

In an embodiment, a modulus of the adhesive layer 60 may be less than a modulus of the protective layer 70. In an embodiment, for example, the modulus of the adhesive layer 60 may be about 0.03 megapascal (MPa), and the modulus of the protective layer 70 may be about 250 MPa. In detail, the modulus of the adhesive layer 60 may be about 0.03 MPA at a room temperature (e.g., about 25° C.) and about 0.1 MPa at a low temperature (e.g., about −20° C.). In an embodiment, as described above, because the protective layer 70 is in contact with the adhesive layer 60 having a modulus significantly less than the modulus of the protective layer 70, the adhesive layer 60 may be elastically stretched and contracted so that the protective layer 70 is not pushed away and detached from the display panel 10.

Accordingly, the display apparatus 1 according to an embodiment may effectively prevent the defects described above. In such an embodiment, the protective layer 70 may be in contact with the adhesive layer 60 to prevent an ESD. In such an embodiment, because the modulus of the adhesive layer 60 is small, even when the display apparatus 1 is folded, the adhesive layer 60 may exhibit an elastic behavior without pushing the protective layer 70 away.

In an embodiment, the protective layer 70 and the adhesive layer 60 may not overlap each other on a plane, i.e., when viewed in a −z direction of FIG. 6. As will be described below, the protective layer 70 is applied and formed by using the adhesive layer 60 as a dam during a manufacturing process of the display apparatus 1, and thus, the protective layer 70 and the adhesive layer 60 may not overlap each other on a plane.

In an embodiment, the protective layer 70 may include a convex portion 71. The convex portion 71 may refer to a portion that convexly protrudes from the protective layer 70 in a direction (e.g., a +z direction of FIG. 6) perpendicular to a surface of the display panel 10 on which the protective layer 70 is arranged. The convex portion 71 may be adjacent to the contact point CP of the protective layer 70 and the adhesive layer 60. As will be described below, the convex portion 71 may be formed because the protective layer 70 is applied and formed by using the adhesive layer 60 as a dam during the manufacturing process of the display apparatus 1.

In an embodiment, a height h1 of the protective layer 70 at the contact point CP of the protective layer 70 and the adhesive layer 60 may be greater than a height h2 of the adhesive layer 60 at the contact point CP. In such an embodiment, the height may refer to a length (e.g., a length in the +z direction of FIG. 6) in a direction perpendicular to a surface of the display panel 10 on which the protective layer 70 and/or the adhesive layer 60 are arranged.

In such an embodiment, the cover window CW may be disposed on the adhesive layer 60. Because the height h2 of the adhesive layer 60 is less than the height h1 of the protective layer 70, when viewed from the front (i.e., when viewed in an x-direction of FIG. 6), the cover window CW disposed on the adhesive layer 60 may partially overlap the protective layer 70.

The cover window CW may be spaced apart from the contact point CP and disposed on the adhesive layer 60. In an embodiment, one end (e.g., an end in the −x direction of FIG. 6) of the cover window CW may be spaced apart from the cover window CW in a direction opposite to the protective layer 70. In such an embodiment, because the cover window CW is spaced apart from the contact point CP, a portion of the adhesive layer 60 may be exposed. Accordingly, the cover window CW may not interfere with the protective layer 70 greater in height than the adhesive layer 60, and the cover window CW may be completely attached to the adhesive layer 60.

Figure 7:
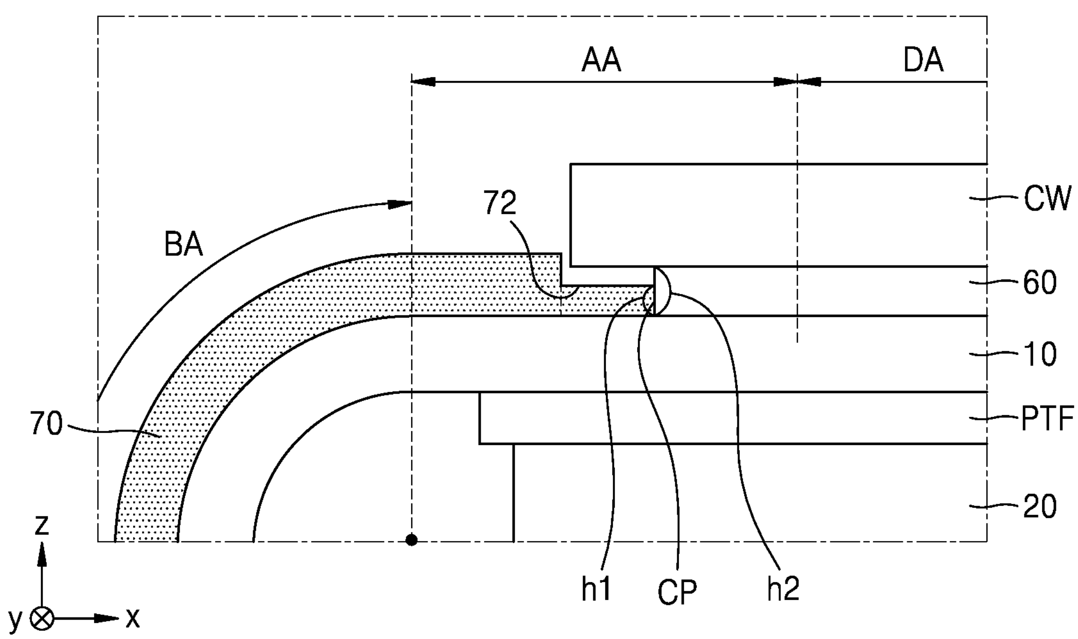
FIG. 7 is a schematic side view of a display apparatus according to an alternative embodiment.

FIG. 7 is a schematic side view of a display apparatus according to an alternative embodiment. The display apparatus shown in FIG. 7 is substantially the same as the display apparatus described above with reference to FIG. 6, and thus, hereinafter, differences from the display apparatus described above with reference to FIG. 6 will be mainly described.

Referring to FIG. 7, in an embodiment, the adhesive layer 60 may be arranged on one surface of the display panel 10. Also, the protective layer 70 may be arranged on one surface of the display panel 10, e.g., on the same surface as the surface on which the adhesive layer 60 is arranged, to cover a portion of the display panel 10, e.g., the bending area BA.

In an embodiment, the protective layer 70 may include a concave (or recessed) portion 72. The concave portion 72 may refer to a portion that is concavely recessed from the protective layer 70 in a direction (e.g., a −z direction of FIG. 7) perpendicular to the surface of the display panel 10 on which the protective layer 70 is arranged. The concave portion 72 may be adjacent to the contact point CP of the protective layer 70 and the adhesive layer 60. The concave portion 72 may be formed by, e.g., removing the protective layer 70 from a point spaced apart from the contact point CP in a direction (e.g., a −x direction of FIG. 7) toward the bending area BA to the contact point CP.

Accordingly, in an embodiment, the height h1 of the protective layer 70 at the contact point CP of the protective layer 70 and the adhesive layer 60 may be less than the height h2 of the adhesive layer 60 at the contact point CP. In such an embodiment, a concave surface of the concave portion 72 may be lower than the upper surface of the adhesive layer 60. In such an embodiment, the height may refer to a length (e.g., a length in a +z direction of FIG. 7) in a direction perpendicular to a surface of the display panel 10 on which the protective layer 70 and/or the adhesive layer 60 are arranged.

In such an embodiment, the cover window CW may be disposed on the adhesive layer 60. Because a height of the protective layer 70 excluding the concave portion 72 is greater than the height h2 of the adhesive layer 60, when viewed from the front (i.e., when viewed in an x-direction of FIG. 7), the cover window CW disposed on the adhesive layer 60 may partially overlap the protective layer 70.

The cover window CW may cover the contact point CP and may be disposed on the adhesive layer 60. That is, a portion of the cover window CW may be disposed on the adhesive layer 60, and another portion of the cover window CW may be arranged over the protective layer 70 beyond the adhesive layer 60, i.e., beyond the contact point CP. In such an embodiment, when viewed on a plane (i.e., when viewed in the −z direction of FIG. 7), the cover window CW may overlap the adhesive layer 60 and the protective layer 70.

In such an embodiment, the portion of the cover window CW beyond the contact point CP may be positioned to overlap the concave portion 72 formed in the protective layer 70. In such an embodiment, the concave surface of the concave portion 72 and the cover window CW may be spaced apart from each other and may not be in contact with each other. In such an embodiment, the concave surface of the concave portion 72 may be spaced from the lower surface (e.g., a surface in the −z direction of FIG. 7) of the cover window CW in a height direction.

In an embodiment, as described above, the protective layer 70 includes the concave portion 72, and the cover window CW is arranged to be accommodated in the concave portion 72 but may be spaced apart from the concave portion 72 such that the cover window CW may be prevented from interfering with the protective layer 70 and the cover window CW may be allowed to be completely attached to the adhesive layer 60.

FIGS. 8 to 11 are schematic diagrams of a method of manufacturing a display apparatus according to an embodiment. The method of manufacturing the display apparatus, according to an embodiment, may be used to manufacture the display apparatus described above but is not limited thereto.

Figure 8:
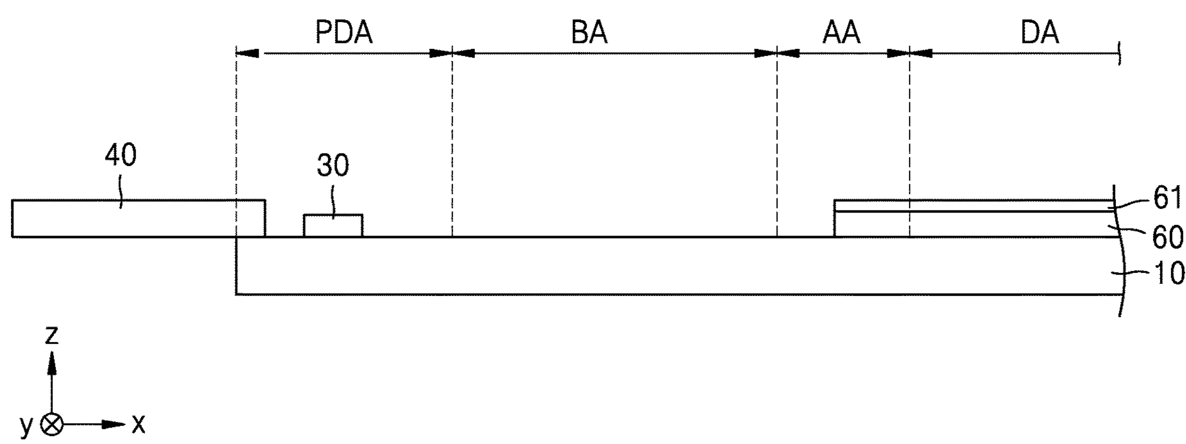
FIGS. 8 to 11 are schematic diagrams of a method of manufacturing a display apparatus according to an embodiment.

Referring to FIG. 8, a side view of the display panel 10 is shown. As described above, the display panel 10 may include the display area DA, the adjacent area AA, the bending area BA, and the pad area PDA, where the adjacent area AA is adjacent to the display area DA, the bending area BA is connected to the adjacent area AA, and the pad area PDA is connected to the bending area BA. The display circuit board 40 may be connected to the pad area PDA.

In an embodiment, the adhesive layer 60 may be provided or formed on the display panel 10. In an embodiment, for example, the adhesive layer 60 may be disposed on the thin-film encapsulation layer TPE (see FIG. 3) of the display panel 10. However, one or more embodiments are not limited thereto, and in an embodiment where a touch sensor layer is disposed on the thin-film encapsulation layer TFE, the adhesive layer 60 may be disposed on the touch sensor layer. Alternatively, in an embodiment where a black matrix and a reflection adjustment layer that absorbs light of a specific wavelength region are disposed on the touch sensor layer, the adhesive layer 60 may be disposed on the reflection adjustment layer.

In an embodiment, the adhesive layer 60 may be in the form of a film and may be attached to the display panel 10 with a release film 61 attached thereto. The release film 61 may cover the upper surface of the adhesive layer 60 and may have a same size as the adhesive layer 60.

The adhesive layer 60 may cover the display area DA. Also, the adhesive layer 60 may be cover part or all of the adjacent area AA adjacent to the display area DA as well as the display area DA.

Figure 9:
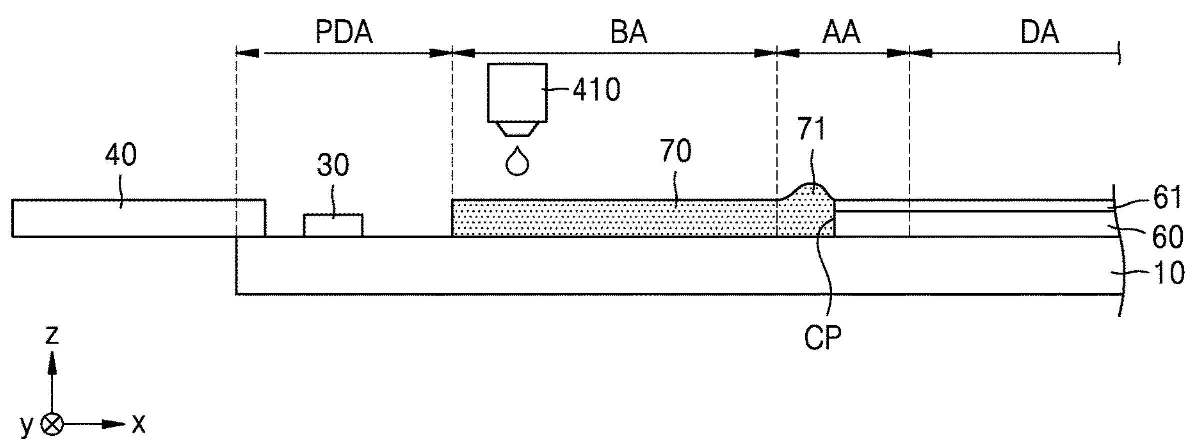

Referring to FIG. 9, the protective layer 70 may be provided or formed on the display panel 10. The protective layer 70 may be formed to cover the bending area BA and to be in contact with the adhesive layer 60 at one side thereof. In an embodiment, the protective layer 70 may include a photocurable resin and may be applied to the display panel 10 through a nozzle of a discharge member 410. The discharge member 410 may discharge liquid droplets by moving in, e.g., a first direction (e.g., a y-direction of FIG. 9) and a second direction (e.g., an x-direction of FIG. 9) crossing the first direction.

In such an embodiment, the liquid droplets may be applied by using the adhesive layer 60 and the release film 61 on the adhesive layer 60 as a dam. Accordingly, the convex portion 71 greater in height than the adhesive layer 60 and the release film 61 may be formed to be adjacent to the contact point CP with the adhesive layer 60. In such an embodiment, because the protective layer 70 is formed by using the adhesive layer 60 and the release film 61 as a dam, on a plan view (i.e., when viewed in a −z direction of FIG. 9), the protective layer 70 and the adhesive layer 60 may not overlap each other.

Figure 10:
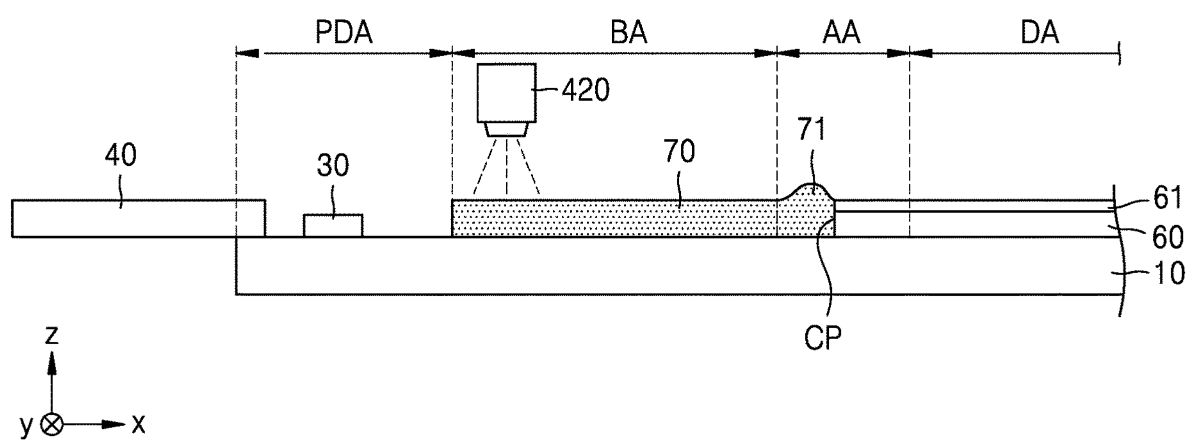

Next, referring to FIG. 10, the liquid droplets may be cured by a curing member 420, such that the protective layer 70 may be formed. The curing member 420 may include a light-emitting member, such as an LED module, and may radiate ultraviolet rays. The curing member 420 may radiate ultraviolet rays by moving in, e.g., a first direction (e.g., a y-direction of FIG. 10) and a second direction (e.g., an x-direction of FIG. 10) crossing the first direction. The liquid droplets may be cured by the radiation of ultraviolet rays, such that the protective layer 70 may be formed.

Figure 11:
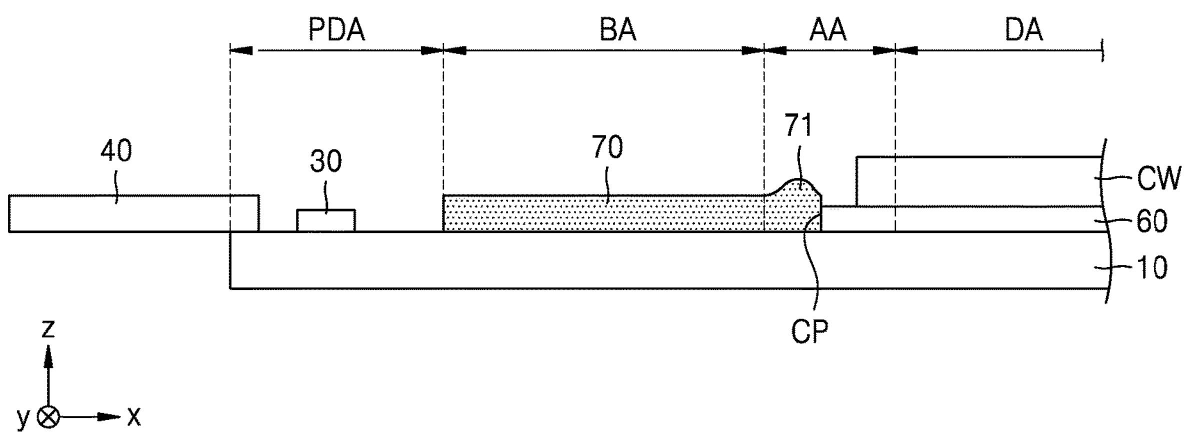

Referring to FIG. 11, the protective layer 70 may be formed, and the release film 61 (see FIG. 10) may be removed. Next, the cover window CW may be disposed on and attached to the adhesive layer 60. In such an embodiment, as described above, the cover window CW may be spaced apart from the contact point CP of the protective layer 70 and the adhesive layer 60. Accordingly, the cover window CW may not interfere with the protective layer 70 and may be completely attached to the adhesive layer 60.

After the cover window CW is attached, the display panel 10 may be bent in the bending area BA, as shown in FIG. 6. The protective layer 70 may protect the bending area BA, and may prevent an ESD because the protective layer 70 is in contact with the adhesive layer 60 and does not form a gap from the adhesive layer 60. Also, although the protective layer 70 and the adhesive layer 60 are in contact with each other, the modulus of the adhesive layer 60 is significantly less than the modulus of the protective layer 70, and thus, the adhesive layer 60 may exhibit an elastic behavior without pushing the protective layer 70 away and causing the protective layer 70 to be detached from the display panel 10.

Figure 12:
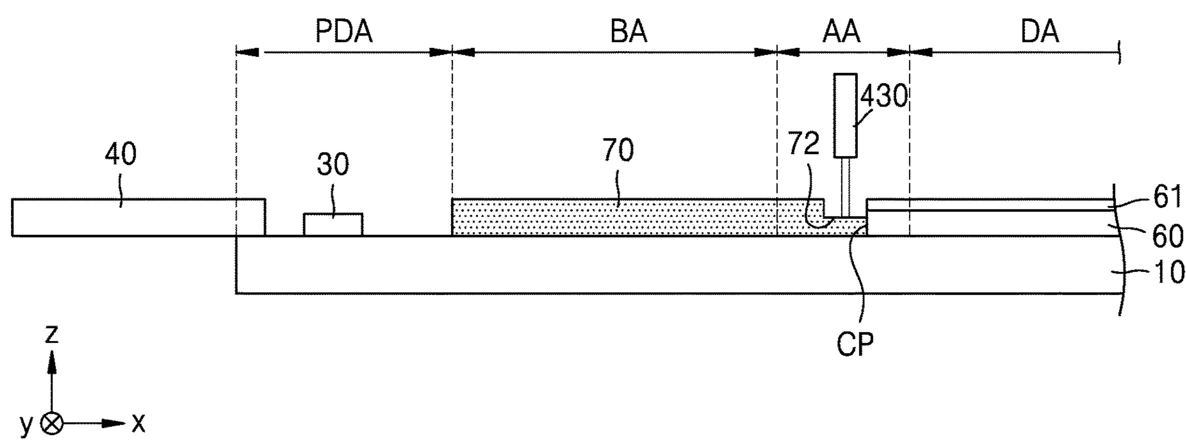
FIGS. 12 and 13 are schematic diagrams of a method of manufacturing a display apparatus according to an alternative embodiment.
Figure 13:
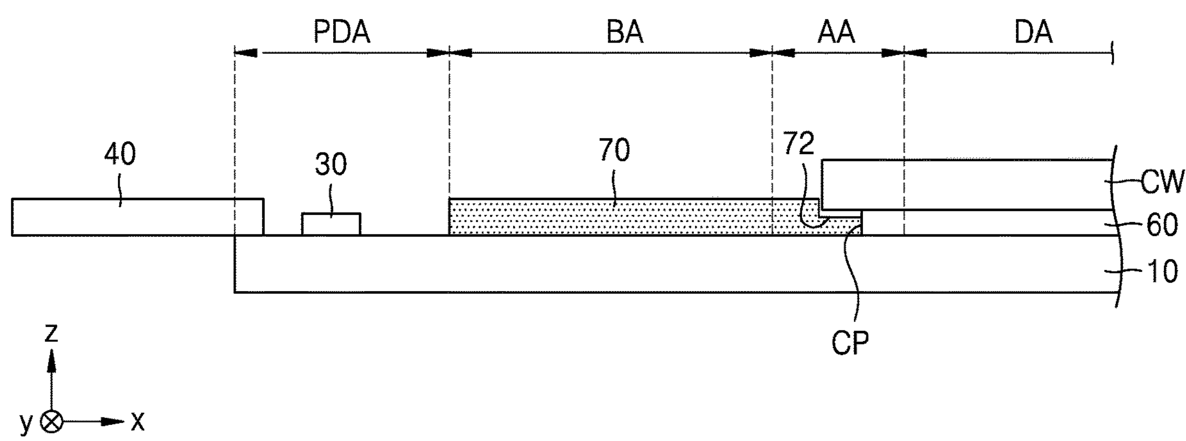

FIGS. 12 and 13 are schematic diagrams of a method of manufacturing a display apparatus according to an alternative embodiment. Hereinafter, differences from the method of manufacturing the display apparatus described above with reference to FIGS. 8 to 11 will be mainly described.

First, the process described with reference to FIGS. 8 to 10 may be performed to manufacture the display apparatus. That is, the adhesive layer 60 may be attached to the display panel 10 with the release film 61 attached thereto, and the protective layer 70 may be applied and cured, and formed by using the adhesive layer 60 and the release film 61 as a dam. Accordingly, the protective layer 70 may include the convex portion 71 to be adjacent to the contact point CP.

Referring to FIG. 12, a portion of the protective layer 70 may be removed by a processing member 430, e.g., a laser device. In an embodiment, the laser device may remove a portion of the protective layer 70 adjacent to the contact point CP. Accordingly, the convex portion 71 generated in a process of forming the protective layer 70 may be removed. Also, in addition to removing the convex portion 71, the concave portion 72 may be formed to have a surface less in height than the adhesive layer 60. The concave portion 72 may be formed by, e.g., removing the protective layer 70 from a point spaced apart from the contact point CP in a direction (e.g., a −x direction of FIG. 12) toward the bending area BA to the contact point CP. A length for which the protective layer 70 is removed in a direction (e.g. the −x direction of FIG. 12) from the contact point CP to the bending area BA may correspond to a length for which the cover window CW to be described below protrudes from the contact point CP toward the bending area BA.

Referring to FIG. 13, the concave portion 72 may be formed by the processing member 430 (see FIG. 12), and the release film 61 (see FIG. 12) may be removed. Next, the cover window CW may be disposed on and attached to the adhesive layer 60. In such an embodiment, as described above, the cover window CW may cover the contact point CP and may be disposed on the adhesive layer 60. In such an embodiment, a portion of the cover window CW may be disposed on the adhesive layer 60, and another portion of the cover window CW may be arranged over the protective layer 70. In such an embodiment, the portion of the cover window CW arranged over the protective layer 70 may be positioned in the cover window CW and may be spaced apart from the concave portion 72 without contacting the concave portion 72. Accordingly, the cover window CW may not interfere with the protective layer 70 and may be completely attached to the adhesive layer 60.

After the cover window CW is attached, the display panel 10 may be bent in the bending area BA, as shown in FIG. 7. The protective layer 70 may protect the bending area BA, and may prevent an ESD because the protective layer 70 is in contact with the adhesive layer 60 and does not form a gap from the adhesive layer 60. Also, although the protective layer 70 and the adhesive layer 60 are in contact with each other, the modulus of the adhesive layer 60 is significantly less than the modulus of the protective layer 70, and thus, the adhesive layer 60 may exhibit an elastic behavior without pushing the protective layer 70 away and causing the protective layer 70 to be detached from the display panel 10.

According to one or more embodiments of the invention, a protective layer in a bending area may be formed to prevent an ESD of a display panel. Accordingly, the quality of the display panel may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel including a display area and a peripheral area surrounding the display area, wherein the peripheral area includes a bending area extending from one side thereof, wherein the display panel comprises a substrate, a pixel circuit layer, a display element layer and a thin-film encapsulation layer;

a cover window arranged on the display area of the display panel;

an adhesive layer between the thin-film encapsulation layer of the display panel and the cover window, wherein the cover window is in contact with the adhesive layer and attached to the display panel via the adhesive layer; and a protective layer covering the bending area and in contact with the adhesive layer, wherein a modulus of the adhesive layer is less than a modulus of the protective layer.

2. The display apparatus of claim 1, wherein the protective layer includes a convex portion in an area adjacent to a contact point where the protective layer and the adhesive layer are in contact with each other.

3. The display apparatus of claim 2, wherein a height of the protective layer at the contact point is greater than a height of the adhesive layer at the contact point.

4. The display apparatus of claim 3, wherein one end of the cover window is spaced apart from the contact point in a direction away from the protective layer.

5. The display apparatus of claim 4, wherein the cover window exposes the adhesive layer between the one end of the cover window and the contact point.

6. The display apparatus of claim 1, wherein the protective layer includes a concave portion in an area adjacent to a contact point where the protective layer and the adhesive layer are in contact with each other.

7. The display apparatus of claim 6, wherein a height of the protective layer at the contact point is less than a height of the adhesive layer at the contact point.

8. The display apparatus of claim 6, wherein the cover window covers the contact point, and one end of the cover window overlaps the concave portion on a plane.

9. The display apparatus of claim 6, wherein one surface of the cover window is spaced apart from a concave surface of the concave portion in a height direction.

10. The display apparatus of claim 1, wherein the protective layer and the adhesive layer are in contact with each other and do not overlap each other on a plane.

11. The display apparatus of claim 1, wherein the display apparatus is folded with respect to a folding axis extending in one direction.

12. A method of manufacturing a display apparatus, the method comprising:

preparing a display panel including a display area and a peripheral area surrounding the display area, wherein the peripheral area includes a bending area extending from one side thereof, wherein the display panel comprises a substrate, a pixel circuit layer, a display element layer and a thin-film encapsulation layer;

providing an adhesive layer on the thin-film encapsulation layer of the display panel;

providing a protective layer to cover the bending area and to be in contact with the adhesive layer, wherein the protective layer has a modulus greater than a modulus of the adhesive layer; and providing a cover window on the adhesive layer, wherein the cover window is in contact with the adhesive layer and attached to the display panel via the adhesive layer.

13. The method of claim 12, wherein the providing protective layer comprises applying the protective layer not to overlap the adhesive layer on a plane, by using the adhesive layer as a dam.

14. The method of claim 13, wherein the providing the protective layer further comprises forming a convex portion in the protective layer in an area adjacent to a contact point where the protective layer and the adhesive layer are in contact with each other.

15. The method of claim 14, wherein the providing the cover window comprises providing the cover window in a way such that one end of the cover window is spaced apart from the contact point in a direction away from the protective layer.

16. The method of claim 14, further comprising:

removing the convex portion and forming a concave portion in the protective layer, in the area adjacent to the contact point where the protective layer and the adhesive layer are in contact with each other.

17. The method of claim 16, wherein the providing the cover window comprises providing the cover window in a way such that the cover window covers the contact point and one end of the cover window overlaps the concave portion on a plane.

18. The method of claim 17, wherein one surface of the cover window is spaced apart from a concave surface of the concave portion not to be in contact with the concave surface of the concave portion.

19. The method of claim 12, wherein the providing the adhesive layer comprises providing the adhesive layer with a release film attached to an upper portion of the adhesive layer, and the providing the protective layer comprises applying the protective layer not to overlap the adhesive layer and the release film on a plane, by using the adhesive layer and the release film as a dam, wherein, after the providing protective layer, the release film is removed before the providing the cover window on the adhesive layer.

20. The method of claim 19, wherein a height of the protective layer a contact point where the protective layer and the adhesive layer are in contact with each other is greater than a height of the adhesive layer at the contact point.

21. An electronic apparatus comprising a display apparatus, wherein the display apparatus comprises:

a display panel including a display area and a peripheral area surrounding the display area, wherein the peripheral area includes a bending area extending from one side thereof, wherein the display panel comprises a substrate, a pixel circuit layer, a display element layer and a thin-film encapsulation layer;

a cover window arranged on the display area of the display panel;

an adhesive layer between the thin-film encapsulation layer of the display panel and the cover window, wherein the cover window is in contact with the adhesive layer and attached to the display panel via the adhesive layer; and a protective layer covering the bending area and in contact with the adhesive layer, wherein a modulus of the adhesive layer is less than a modulus of the protective layer.

* * * * *